United States Patent [19]
Hummel

[11] 3,856,497
[45] Dec. 24, 1974

[54] METHOD OF MAKING CRYSTALLIZED GLASS
[75] Inventor: Merritt J. Hummel, Lower Burrel, Pa.
[73] Assignee: PPG Industries, Inc., Pittsburgh, Pa.
[22] Filed: Mar. 22, 1973
[21] Appl. No.: 343,981

Related U.S. Application Data
[63] Continuation-in-part of Ser. No. 239,335, March 29, 1972, abandoned.

[52] U.S. Cl. ................................. 65/33, 106/39.7
[51] Int. Cl. ........................................... C03b 29/00
[58] Field of Search ............... 65/33; 106/39.8, 39.7

[56] References Cited
UNITED STATES PATENTS

| | | | |
|---|---|---|---|
| 3,006,775 | 10/1961 | Chen | 106/39.7 X |
| 3,489,577 | 1/1970 | Tashiro et al. | 65/33 X |
| 3,673,049 | 6/1972 | Giffen et al. | 106/39.7 X |
| 3,788,865 | 1/1974 | Babcock et al. | 106/39.7 |
| 3,804,608 | 4/1974 | Gaskell et al. | 65/33 |

Primary Examiner—S. Leon Bashore
Assistant Examiner—Frank W. Miga
Attorney, Agent, or Firm—William J. Uhl

[57] ABSTRACT

Crystallized glass has hitherto been made by the use of the mineral petalite as the source of lithium values. Petalite is in short supply, and when attempts are made to use lithium carbonate or a similar lithium salt in place of petalite in the glass batch, unwanted microcracking develops during a subsequent crystallizing heat treatment with certain glass compositions. Such microcracking can be avoided by using a purposefully small addition to the petalite-free batch of an alkali metal salt, wherein the alkali metal is selected from the class consisting of potassium, rubidium and cesium.

5 Claims, No Drawings

METHOD OF MAKING CRYSTALLIZED GLASS

CROSS REFERENCE TO RELATED APPLICATION

This application is a continuation-in-part of copending application Ser. No. 239,335, filed Mar. 29, 1972, now abandoned.

BACKGROUND OF THE INVENTION

1. Field of the Invention

This invention relates to a method of making crystallized glass, and in particular, to a method of making such glass when starting with lithium carbonate or the like, rather than the mineral petalite, as the source of lithium values. In one aspect, the invention concerns avoiding microcracking of the glass surface during the heat treatment used to crystallize the glass by the purposeful addition of potassium, rubidium or cesium values.

2. Description of the Prior Art

Glass-ceramic articles produced by devitrification or crystallization of glass are well known in the art. In U.S. Pat. No. 3,625,718 to Petticrew, there is disclosed gass compositions which are particularly suited for crystallization. Such compositions comprise on a percentage by weight basis from 64 to 74 percent $SiO_2$, from 15 to 23 percent $Al_2O_3$, from 3.3 to 4.8 percent $Li_2O$, from 1 to 3.8 percent ZnO, from 1.2 to 2.4 percent $TiO_2$, from 0 to 2 percent $ZrO_2$, and wherein the named ingredients constitute at least 90 percent by weight of the total glass composition. Additional components such as $As_2O_3$ and $Sb_2O_5$ sometimes end up in the final glass composition because they are added to the glass batch to act as fining agents.

Such glass compositions, as disclosed above, can be obtained by suitably melting a mixture of sand, petalite, hydrated alumina, mixed zinc and zirconium silicates, arsenic trioxide, antimony trioxide, zirconium oxide, titanium dioxide and a suitably quantity of appropriate cullet. After the batch has been suitably melted, fined, homogenized and pressed into plates, the composition can be heat treated to crystallize or devitrify the glass. At the end of the heat treating period, the crystalline phase constitutes about 98 percent of the composition with the remainder being a glassy phase.

Crystallized glass articles offer signifcant advantages over ordinary amorphous glass articles in that crystallized glass has a high modulus of rupture and a very low lineal coefficient of thermal expansion, generally below $20 \times 10^{-7}$ per °C., which makes these glasses useful as cooking surfaces for kitchen ranges, hot plates and the like.

As has been mentioned, it has been customary to use the mineral petalite as the source of lithium values in making the glass of the kind indicated above. Petalite consists principally of lithium aluminum silicates, a typical analysis being 4.29 percent $Li_2O$, 16.15 percent $Al_2O_3$, 77.1 percent $SiO_2$, 0.49 percent $Na_2O$, 0.31 percent $K_2O$ and 0.026 percent $Fe_2O_3$. Petalite is in very short supply, being available substantially only from Rhodesia. When efforts were made to produce crystallized glass of the kind indicated above, but with the use of lithium carbonate and the like in place of the petalite, microcracks developed in the glass surface during the heat treatment used to crystallized the glass.) The resultant glass would generally be weaker than normal crystallized glass, and because of the tendency of the microcracks to catch dirt, the cracked crystallized glass sheets or plates stained easily and were difficult to clean, making them commercially unacceptable. Unfortunately, the prior art did not afford any clear indication of what to do to overcome the problem.

It is known in the prior art that sources other than petalite can be used in the glass batch as a source of lithium values, for example, U.S. Pat. No. 3,489,577 to Tashiro et al., U.S. Pat. Nos. 3,352,656 and 3,352,698 and British Pat. No. 1,028,871, all to McMillan et al., disclose the use of lithium carbonate in the glass batch. These same references also disclose the optional incorporation of a potassium salt into the glass batch. Surprisingly, there is no disclosure in these references of a microcracking problem or of the effect that potassium has in eliminating the problem. A possible reason for this lack of disclosure is that the glass compositions of the immediately above cited references are significantly different than the glass compositions used in the practice of this invention.

Therefore, it appears that the prior art has not recognized the problem of glass surface microcracking which occurs in certain crystallized glass compositions during the heat treatment. This invention has uncovered the problem and provided a solution.

SUMMARY OF THE INVENTION

In accordance with this invention, it has been found that the problem of glass surface microcracking which occurs during the crystallizing heat treatment of glass of a certain composition which has been made by starting with a glass batch containing lithium carbonate or the like as a source of lithium values, rather than petalite, may be overcome by purposefully adding a potassium, rubidium and/or cesium salt to bring the potassium, rubidium and/or cesium content of the glass (measured as the oxide) to at least 0.15 percent by weight based on total weight of the glass composition. Particular glasses in which microcracking is a problem have the following composition:

| Component | Percent by Weight |
|---|---|
| $SiO_2$ | 64 – 74 |
| $Al_2O_3$ | 15 – 23 |
| $Li_2O$ | 3.3 – 4.8 |
| ZnO | 1 – 3.8 |
| $TiO_2$ | 1.2 – 2.4 |
| $ZrO_2$ | 0 – 2.0 |
| $F^-$ | 0.15 – 0.40 | wherein the above ingredients constitute at least 90 percent by weight of the glass composition.

DETAILED DESCRIPTION

In practicing the instant invention, the glass-making ingredients are mixed together by techniques well known in the art to give a wellmixed glass batch. In the batch mixing, lithium carbonate or the like is used as a source of lithium values, rather than petalite. This change is preferably a total one, that is, no petalite is used, but those skilled in the art will perceive that the principles of the invention come into play whenever a major portion of the lithium required is to be derived from the source other than petalite. It will also be clear that the obvious procedure is to use in the glass batch an amount of lithium carbonate which is equivalent to the lithium value in petalite. For example, in place of 100 pounds of petalite, which affords 4.9 pounds of lithium (measured as $Li_2O$), there can be used 12.2 pounds of lithium carbonate which affords the same quantity of lithium. Suitable adjustments should also be made in the amount of sand and alumina used in preparing the batch.

It is by no means essential that the lithium values used in preparing the crystallized glass come solely and precisely from lithium carbonate. For example, satisfactory results may be obtained with lithium chloride, fluoride or sulfate used in place of part or all the lithium carbonate. The distinction from the prior art is that the previous practice has been the use of the mineral petalite, which contains various different metals in addition to lithium. It is more accurate to characterize the invention as one that uses a substantially potassium, rubidium and cesium-free lithium-bearing ingredient, which the mineral petalite is not.

Though it is probably in most instances most convenient to provide for the addition of the required lithium values at the outset, by compounding of the batch materials before they are fed to the furnace and melted, there is not in principle any reason to rule out adding the potassium-free lithium-bearing ingredient at any time up until the molten glass composition is completely composed and ready for forming.

As indicated above, other ingredients of a batch material are present, sand, alumina, silicates of zinc and/or zirconium, zirconium oxide, titanium dioxide cullet and, to the extent desired or necessary, oxides of arsenic and/or antimony which act as fining agents in the making of glass compositions. The ranges for the batch contents should be selected such that the composition in the finished glass is as follows:

| Component | Percent by Weight |
|---|---|
| $SiO_2$ | 64 – 74 |
| $Al_2O_3$ | 15 – 23 |
| $Li_2O$ | 3.3 – 4.8 |
| ZnO | 1 – 3.8 |
| $TiO_2$ | 1.2 – 2.4 |
| $ZrO_2$ | 0 – 2.0 |
| $F^-$ | 0.15 – 0.40 |
| $K_2O$ | 0.15 – 2.5 |

Melting of the batch ingredients may be done in a furnace or a pot and preferably in a tank adapted for continuous casting. The potassium-free lithium-bearing ingredient may be added at any stage of the process, so long as there is sufficient homogenization that the lithium is distributed substantially uniformly throughout the composition of the glass as it is made ready for forming.

Lithium compounds are known for their fluxing ability. Therefore, it will usually be desirable to add the potassium-free lithium-bearing compound to a cold, starting batch material, before melting.

Those skilled in the art of preparing crystallized glasses are well aware of the desirability of using relatively finely divided batch materials and of premixing the cold, starting batch. This is, of course, not absolutely essential, especially if appropriate means are used for homogenizing the melt (stirrers, bubblers and the like). In most instances, however, the batch materials including the lithium carbonate or the like are preferably in a finely divided form.

To the glass batch is added a suitable amount of an appropriate potassium, rubidium and/or cesium salt. Salts, such as carbonates, fluorides and sulfates, are suitable. It should be clear that by potassium, rubidium or cesium salt is meant glass-making ingredients containing potassium, rubidium or cesium. Thus, compounds other than salts and complex mixed salts which contain in part potassium, rubidium and cesium are included under the definition of potassium, rubidium and cesium salt. What is essential is that the potassium, rubidium and cesium salt be a precursor of corresponding alkali metal oxide in the final glass composition.

A suitable amount of potassium, rubidium or cesium salt to be added may be calculated from the desired and corresponding oxide content in the final composition. The salt is preferably, but not necessarily, added in a finely divided form, that is, such as to pass through a No. 50 sieve in the U.S. Sieve Series. The amount of salt which should be added is that sufficient to yield on the oxide basis a potassium, rubidium and/or cesium oxide content of at least 0.15 percent by weight, and preferably from 0.15 to 2.5 percent by weight, and most preferably 0.17 to 0.60 percent by weight, the percentages by weight being based on the total weight of the final glass composition. In general, the larger the nucleus of the alkali metal, the lesser the amount required to prevent microcracking. Thus, less cesium (on a weight basis) is required to prevent microcracking than rubidium and potassium. However, with a potassium oxide content of less than 0.15 percent by weight, the desired freedom from microcracking during the subsequent crystallizing heat treatment tends not to be obtained. If the potassium, rubidium or cesium oxide content is greater than the upper limit, that is, greater than 2.5 percent by weight, the resulting glass composition will have poor chemical durability and will stain easily and be difficult to clean. It should be noted at this point that sodium salts cannot be used in place of potassium, rubidium or cesium in the practice of this invention. Although soda can optionally be included in the glass composition, if it is included in the place of potassium, rubidium or cesium, unwanted microcracking of the glass surface will be evidenced.

After the glass-making ingredients have been uniformly mixed with one another, the glass batch is charged to a furnace or a tank where the glass is melted and fined. The temperatures for melting and fining of the crystallizable glasses are generally significantly higher than the melting and fining temperatures of more conventional glass batches. Accordingly, the melting and fining temperatures of the glass batches of this invention are about 3,100° F., whereas conventional soda-lime-silica glasses are melted and fined at temperatures of about 2,700°

After the glass has been suitably melted and fined, usually for a period of about 8 hours, the glass is formed, preferably by continuously casting the molten glass between forming rolls. Thereafter, the glass is annealed, inspected, cut to size and optionally decorated. The glass is now ready for crystallizing heat treatment.

The heat treatment is probably the most critical step in the crystallized glass-making process and, to a large extent, determines the properties of the glass-ceramic. A typical heat treatment schedule involves the heating of the glass from room temperature to a temperature of about 1,300° F. over the period of about 10 to 12 hours to cause nucleation. The material is still a glass at this stage with very small crystals in an embryo stage (nuclei) beginning to emerge in the bulk of the glass. The glass is then slowly heated at a rate of about 10° F. per hour for a period of about 18 hours to increase the number and size of the crystals. At about 1,500° F., the crystals grow rapidly and in a short period of time, the material changes from a glass to a 98 percent crystalline body; the remaining 2 percent being a glassy phase. The crystal which first forms is beta-eucryptite. The devitrified glass is heated further at a rate of about 90° F. per hour for about 4 hours, reaching a final temperature of about 1,850° F. to transform the eucryptite crystal gradually to a beta-spodumene crystal. The temperature is held at about 1,850° F. to cause the crystals of spodumene to grow. It should be noted that the crystalline phase is a solid solution of beta-spodumene and silica (keatite structure). The devitrified sheets of glass are then cooled to room temperature. This cooling generally takes place over a period of about three hours. It is during the heat treatment step (which includes the period of cooling) that so-called "microcracking" develops in the glass surface. By "microcracking" is meant long sweeping hairline fractures developed in the glass surface. The microcracking can be detected by eyesight, especially if the glass is treated with a dye solution which highlights the cracking. Upon microscopic examination, the microcracks are seen to be incised into the devitrified glass surface to a depth of about 50 to 100 microns, and the cracks have a width of about 10 to 20 microns. The microcracking is unsightly and makes the glass unsuitable for commercial use. The microcracks can be removed by grinding and polishing, but this requires a very expensive additional fabricating step. This invention avoids the need for this additional step and provides a method for taking glass sheets made from a petalite-free glass batch and heat treating the glass to crystallize it without developing unwanted microcracking in the glass surface.

Although not intending to be bound by any theory, the reason why the glass compositions of this invention are believed to form microcracks on heat treatment is that these compositions are very volatile, with zinc oxide and fluoride being the most volatile components. Moreover, these components are both believed to have an important effect on the rate and extent of crystallization. When the glass is heat treated and components volatilize, the volatilization is greatest at the surface and, as a result, the composition of the glass at its surface is different from the composition of the glass in the interior regions. The difference in composition will be principally in the ZnO and fluoride content. Since these ingredients have an important effect on crystallization, the crystallization at the surface of the glass is different from that in the interior regions of the glass. It is believed that crystallization proceeds slower and to a lesser extent in the surface than in the interior regions of the glass. This difference in crystallization leads to different coefficients of thermal expansion with the surface region of the glass having a higher coefficient than the interior. As the glass begins to cool, the difference in coefficients of thermal expansion puts the surface in tension. To relieve the tension, stress cracks (i.e. microcracking) develops in the surface. The reason why it is believed potassium, rubidium and cesium relieve the surface cracking is that these cations are relatively large and are not absorbed into the crystal lattice structure. Hence, the potassium, rubidium and cesium remain in the glassy phase where they act as a flux and reduce the viscosity of glass phase. As a result, when a volatile potassium, rubidium and/or cesium-containing glass composition is heat treated and cooled, the tension developing in the glass surface can relieve itself by viscoelastic flow. In other words, the glassy phase, by being at a lower viscosity due to the presence of the potassium, rubidium and/or cesium, can flow to relieve the stresses being developed on the surface. In the absence of potassium, rubidium and cesium, the glassy phase does not have a low enough viscosity to flow sufficiently to relieve the stresses being developed in the surface of the glass. As a result, the glass microcracks to relieve the stresses.

If this theory is correct, it explains why soda is not effective in preventing microcracking. Soda, with its relatively small cation, is absorbed into the crystal lattice where it cannot act to reduce the viscosity of the glassy phase.

EXAMPLES

EXAMPLE 1

(DESCRIPTION OF THE PREFERRED EMBODIMENT)

To a commercial-size glass tank capable of containing about 35 tons of molten glass and designed for continuous casting were added on a continuous basis at the feed end of the tank the following well-mixed batch ingredients:

| Ingredient | Parts by Weight |
| --- | --- |
| Silica | 700 |
| Hydrated alumina | 296 |
| Lithium carbonate | 83 |
| Zinc zirconium silicate | 31 |
| Zinc oxide | 10.5 |
| Titanium dioxide | 15.0 |
| Lithium fluoride | 13.5 |
| Soda ash | 4.0 |
| Lithium sulfate | 6.0 |
| Potassium carbonate | 2.5 |
| Antimony oxide | 4.0 |
|  | 1165.5 |
| Cullet[1] | 1360 |

[1] The glass cullet has the following composition, expressed as percent by weight: $Na_2O$, 0.31%; $Li_2O$, 4.13%; $F^-$, 0.27%; $SiO_2$, 70.67%; $Al_2O_3$, 19.39%; $ZrO_2$, 1.54%; ZnO, 1.53%; $Fe_2O_3$, 0.05%; $TiO_2$, 1.56%; $K_2O$, 0.18%; $As_2O_3$, 0.01%; and $Sb_2O_5$, 0.33%.

The glass batch was melted and fined for about 8 hours at a temperature of about 3,200° F. (melting zone) to 2,900° F. (fining zone). The molten glass was removed from the tank at the working zone at a temperature of 2,600° F. The molten glass was then continuously cast between a pair of heavy cast-iron, water-cooled rolls. These rolls are set very close against the delivery lip of the tank so that the glass is forced into the pinch of the rolls and thus squeezed to the desired thickness for the ribbon. This is possible only because the high viscosity of the glass permits it to jump the gap between the lip and the rolls without sagging. As it passes from the water-cooled forming rolls, the surfaces have become sufficiently chilled to form a more or less self-sustaining sheet or ribbon, even though the body of the glass is still very hot.

The formed sheet is picked up on smaller apron rolls, which are actually a part of an annealing lehr mechanism, but are not enclosed as is the rest of the lehr. Consequently, in this area, the glass loses heat rapidly and the temperature falls from about 2,300° F., leaving the rolls, to about 1,500° F., entering the lehr. The lehr is essentially an open tunnel in which graduated temperatures are maintained by means of gas fires. In the lehr, the glass is annealed to release the thermal strains introduced into the glass by forming. After annealing, the glass is inspected and cut to size. The glass at this stage had a nominal thickness of about 0.2 inch and had the following composition:

| Component | Percent by Weight |
|---|---|
| $SiO_2$ | 70.67 |
| $Al_2O_3$ | 19.39 |
| $Li_2O$ | 4.13 |
| $TiO_2$ | 1.56 |
| $ZrO_2$ | 1.54 |
| $ZnO$ | 1.53 |
| $Sb_2O_5$ | 0.33 |
| $Na_2O$ | 0.31 |
| $K_2O$ | 0.18 |
| $F^-$ | 0.27 |

For heat treating, the glass is stored on racks or the like and put into a kiln. The temperature of the kiln is raised from room temperature to 1,300° F. (nucleation temperature) over the period of about 3 to 4 hours and held at this temperature for about 6 to 10 hours. The glass is then slowly heated at a rate of about 10° F. per hour for a period of about 18 hours. The glass which has by now divitrified is heated at a rate of 90° F. per hour for about 4 hours, reaching a final temperature of about 1,850° F. and held at this temperature for 4 hours. The kiln temperature was then lowered at a rate of 150° F. per hour to 1300° F. and then the kiln was slowly cooled to room temperature. The glass was removed from the kiln and inspected. Upon visual inspection, the glass was found to be opaque in appearance with no microcracking in the surface. Upon X-ray diffraction analysis, the glass was found to be crystallized to the extent of 98 percent beta-spodumene solid solution and the glass had a modulus of rupture of about 25,000 pounds per square inch and a thermal expansion coefficient of about $-4 \times 10^{-7}$ per °C. over the temperature range of 25° C. to 300° C.

EXAMPLE 2

The procedure and the method of Example 1 was followed, with the exception that no additional potassium carbonate was added to the batch. Upon analysis, the potassium oxide content of the glass was found to be only 0.03 percent. After heat treatment as described in Example 1, the glass was examined and found to be opaque but with severe microcracking of the surface. The microcracking was extensive, making the glass unacceptable for commercial applications.

EXAMPLES 3 – 6

Four glass batches were prepared having the following ingredients:

| Batch Ingredient | Parts by Weight |
|---|---|
| Silica | 702 |
| Hydrated alumina | 291 |
| Lithium carbonate | 92 |
| Zinc zirconium silicate | 31 |
| Zinc oxide | 6 |
| Titanium dioxide | 14.8 |
| Lithium fluoride | 12 |
| Soda ash | 2.5 |
| Lithium nitrate | 3 |
| Glass cullet[1] | 1360 |

[1] The glass cullet had the following composition expressed as percent by weight: $Na_2O$, 0.47%; $Li_2O$, 4.10%; $F^-$, 0.36%; $SiO_2$, 71.15%; $Al_2O_3$, 19.21%; $ZrO_2$, 1.50%; $ZnO$, 1.56%; $Fe_2O_3$, 0.04%; $TiO_2$, 1.51%; $K_2O$, 0.02%; $As_2O_3$, 0.04%; and $Sb_2O_5$, 0.02%.

The four batches each weighed about 750 grams and to three of the batches were added varying amounts of potassium carbonate, that is, to one batch was added 1.22 grams of potassium carbonate, to the second batch was added 2.75 grams of potassium carbonate and to the third batch was added 4.79 grams of potassium carbonate. The fourth batch was free of any added potassium carbonate and was used as a control.

The four batches were charged to Lavasil crucibles and placed in a furnace at a temperature of 2,400° F. The glass was melted and fined for a period of about 6 hours, during which time the temperature in the furnace was raised to 3,000° F. The crucibles were removed from the furnace and placed in an annealing kiln which was at a temperature of 1,300° F. The crucibles were left in the annealing kiln for a period of about 12 hours, during which time the temperature of the kiln gradually lowered to about 140° F. The glasses, after annealing, had the following composition:

| Component | Control (3) | Percent by Weight (4) | (5) | (6) |
|---|---|---|---|---|
| $SiO_2$ | 71.15 | 71.04 | 70.94 | 70.80 |
| $Al_2O_3$ | 19.21 | 19.18 | 19.14 | 19.11 |
| $Li_2O$ | 4.10 | 4.09 | 4.09 | 4.07 |
| $ZnO$ | 1.56 | 1.56 | 1.56 | 1.56 |
| $TiO_2$ | 1.51 | 1.51 | 1.51 | 1.51 |
| $ZrO_2$ | 1.50 | 1.50 | 1.50 | 1.50 |
| $Na_2O$ | 0.47 | 0.47 | 0.47 | 0.47 |
| $F^-$ | 0.36 | 0.36 | 0.36 | 0.36 |
| $K_2O$ | 0.02 | 0.15 | 0.30 | 0.50 |

The glass, after annealing, was then ready for heat treating. The glasses, fused in the Lavasil crucibles, were cut into sections, ground and polished and placed in a furnace at a temperature of about 1,000° F. The temperature was raised over a period of about 3 hours to 1,325° F. and the temperature was maintained for 8 hours. The temperature was then raised at a rate of about 75° F. per hour over a period of about 7 hours to 1,850° F. The temperature was held at 1,850° F. for four additional hours. The furnace was cooled to 1,300° F. and the samples removed from the oven. The glasses were opaque and by X-ray diffraction analysis was determined to be about 98 percent beta-spodumene. Upon visual observation, the glass which had no additional potassium carbonate added was severely cracked at the surface. The glass with 0.15 percent $K_2O$ had a much improved surface with the extent of cracking being considerably less. The glass with 0.30 percent $K_2O$ had an extremely good surface with only minimal cracking. The glass with 0.5 percent $K_2O$ had an essentially crack-free surface.

To obtain a quantitative measure of the extent of microcracking in the above examples, the fragment outlines in a projected top surface were counted and divided by the top surface area to give the number of fragments per square inch of surface. The results are given below:

|  | Control (3) | Example (4) | (5) | (6) |
| --- | --- | --- | --- | --- |
| fragments per square inch | 410 | 376 | 120 | 107 |

EXAMPLES 7 – 10

Three glass batches were prepared having the following ingredients:

| Batch Ingredients | Weight in Grams |
| --- | --- |
| Silica | 70.20 |
| Lithium carbonate | 9.00 |
| Lithium fluoride | 1.10 |
| Lithium sulfate | 0.50 |
| Hydrated alumina | 29.10 |
| Zinc zirconium silicate | 3.10 |
| Arsenic oxide | 0.10 |
| Antimony oxide | 0.30 |
| Zinc oxide | 0.95 |

To the first batch was added 0.73 grams of potassium carbonate, to the second batch was added 1.22 grams of rubidium carbonate, and to the third batch was added 1.92 grams of cesium sulfate.

The three batches were each charged to Lavasil crucibles and melted under the conditions described above for Examples 3–6. The glasses after annealing had the following compositions:

| | Percent by Weight on an Oxide Basis | | | |
| --- | --- | --- | --- | --- |
| Component | Control (7) | (8) | (9) | (10) |
| $SiO_2$ | 71.17 | 70.80 | 70.26 | 69.62 |
| $Al_2O_3$ | 19.21 | 19.11 | 18.97 | 18.83 |
| $Li_2O$ | 4.10 | 4.07 | 4.03 | 4.01 |
| ZnO | 1.56 | 1.56 | 1.56 | 1.56 |
| $TiO_2$ | 1.51 | 1.51 | 1.51 | 1.51 |
| $ZrO_2$ | 1.50 | 1.50 | 1.50 | 1.50 |
| $Na_2O$ | 0.47 | 0.47 | 0.47 | 0.47 |
| $F^-$ | 0.36 | 0.36 | 0.36 | 0.36 |
| $K_2O$ | — | 0.50 | — | — |
| $Rb_2CO_3$ | — | — | 1.22 | — |
| $Cs_2SO_4$ | — | — | — | 1.92 |

The glasses, after annealing, were then ready for heat treating. The glasses fused in the Lavasil crucibles were cut into sections, ground and polished and placed in a furnace for the crystallizing heat treatment. The heat heating conditions were those described above in Examples 3–6.

After heat treating the glasses were removed from the oven. The glasses were opaque and X-ray diffraction analysis indicated the glasses to be about 98 percent beta-spodumene.

Upon visual observation, the glass which had no potassium, rubidium or cesium salt added to the batch was severely cracked at the surface. The glass with potassium carbonate and rubidium carbonate added to the batch had a much improved surface with the extent of microcracking being considerably less. The glass with cesium sulfate added to the batch had the best surface with essentially no cracking.

Using the numerical rating of fragments per square inch of surface as described above in Examples 3–6, the extent of microcracking was as follows:

|  | Control (7) | Example (8) | (9) | (10) |
| --- | --- | --- | --- | --- |
| fragments per square inch | 136 | 107 | 72 | 24 |

The glass compositions specified above were determined by X-ray fluorescence and by wet chemical analysis.

The existence, type and amount of crystallinity in the devitrified glass samples was determined by means of a conventional X-ray diffractometer equipped with a Geiger counter and a curve- or trace-drawing device. As is well known, the monochromatized X-ray beam is directed against a specimen to be identified at an angle which is altered progressively, and the reflections from the various faces of the crystals of the particular crystalline compound in the specimen are converted to amplified electrical impulses by the Geiger counter and are reproduced as series of peaks on the trace. Since each crystalline compound produces peaks which are characteristic of itself, identification of the crystalline compound can be accomplished by anyone skilled in the art in reading and constructing such a trace, provided that its characteristic peak is known.

The modulus of rupture mentioned above is a measure of the flexural strength of the crystallized material and was determined by the procedures set forth in A.S.T.M. C 158.

The average lineal coefficient of thermal expansion referred to above was determined by the procedures set forth in A.S.T.M. E 228.

The extent and the degree of microcracking referred to above was determined by the use of a low power microscope, that is, of about 90X. The width of the cracks at the surface can be determined directly from microscopic examination, whereas the depth of the cracking can be determined by grinding and polishing the surface until no cracks are observed by microscopic examination. The depth of the surface removed by grinding and polishing is taken as the depth of the microcrack.

For example, a crystallized glass sheet which has microcracking throughout its surface is first measured for thickness with a micrometer which has an accuracy to ± 2.5 microns. The cracked surface is then ground and polished with a commercially available grinding and polishing machine, such as an American Optical Hand Surfacing Machine. For grinding, a fine grit such as silicon carbide is used and the polishing is accomplished using a felt polishing cloth and rouge as the polishing medium. Grinding and polishing is interrupted periodically by microscopic examination and the process is continued until there is no evidence of microcracks in the glass surface. Using this technique, the microcracks have been found to be wedge-shaped with the thickness being greatest at the surface and of decreasing thickness as the crack propagates into the surface of the crystallized glass. To insure that the full depth of the crack has been ascertained, the crystallized glass sample, after microscopic examination, reveals no evidence of microcracking, can be etched with a 2–5 percent by weight aqueous hydrofluoric acid solution and re-examined by microscope. The acid etch uncovers the final few microns of the crack which are latent and do not appear in a microscopic examination without the acid etch. After the microscopic examination indicates no evidence of microcracking, the thickness of the crystallized glass sample is measured and the difference between this and the original thickness of the crystallized glass sample is taken as the depth of the microcracks.

I claim:

1. A method of making a crystallized glass article substantially free of microcracking, comprising:
   a. preparing a glass batch consisting essentially of (1) a silica, (2) an alumina, (3) lithium family glass batch ingredient consisting of a lithium salt, and (4) a zinc salt in an amount sufficient to provide a crystallized glass article from said glass batch having a ZnO content, percent by weight on an oxide weight basis of 1 to 3.8, which crystallized glass article obtained upon cooling a melt of said glass batch, forming and heat treating said article is characterized by the presence of microcracks in the surface thereof;
   b. adding to said glass batch an alkali metal salt wherein the alkali metal is a member of the group consisting of potassium, rubidium and cesium, said alkali metal salt being present in an amount sufficient to provide a glass article upon cooling a melt of said glass batch having a content of an oxide of the alkali metal of said salt, percent by weight on an oxide weight basis, of 0.15 to 2.50;
   c. melting the glass batch containing the ingredients set forth in (a) and (b) to form a glass melt;
   d. cooling said glass melt and subsequently therewith;
   e. forming a glass article having the following composition on an oxide weight basis:

| Component | Percent by Weight On An Oxide Basis |
|---|---|
| $SiO_2$ | 64–74 |
| $Al_2O_3$ | 15–23 |
| $Li_2O$ | 3.3–4.8 |
| ZnO | 1–3.8 |
| $TiO_2$ | 1.2–2.4 |
| $ZrO_2$ | 0–2 |
| F | 0.15–0.40 |
| $R_2O$, where R is Potassium rubidium or cesium | 0.15–2.50, | and
   f. heat treating said glass article at temperatures and for times sufficient to form crystals throughout the glass article and form a crystallized glass article having the surfaces thereof substantially free of microcracks.

2. The method of claim 1, in which the lithium salt is lithium carbonate.

3. The method of claim 2, in which the alkali metal salt is selected from the class consisting of carbonates, fluorides and sulfates.

4. The method of claim 1, in which the content of the alkali metal selected from the group consisting of potassium, rubidium and cesium of the glass measured as the oxide is within the range of 0.17 to 0.60 percent by weight based on total weight of the glass composition.

5. The method of claim 1, in which the crystalline phase is a solid solution of beta-spodumene and silica.

* * * * *